(No Model.)  2 Sheets—Sheet 1.
E. A. THISSELL.
RECORDING GAGE.
No. 253,786.  Patented Feb. 14, 1882.
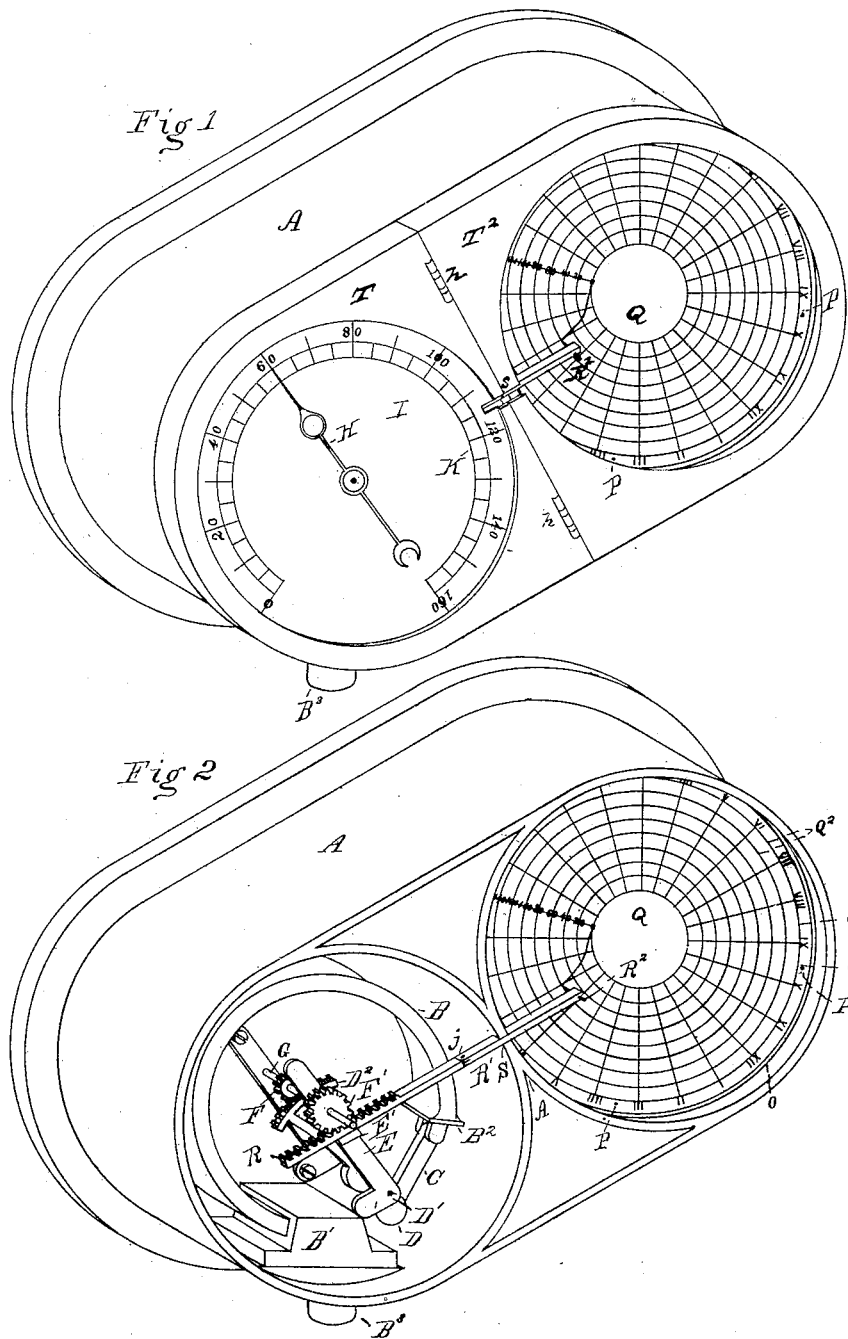
Witnesses
Kirkley Hyde.
William L. Davis.
Inventor
Earl Amri Thissell
By Albert M. Moore,
His Attorney.

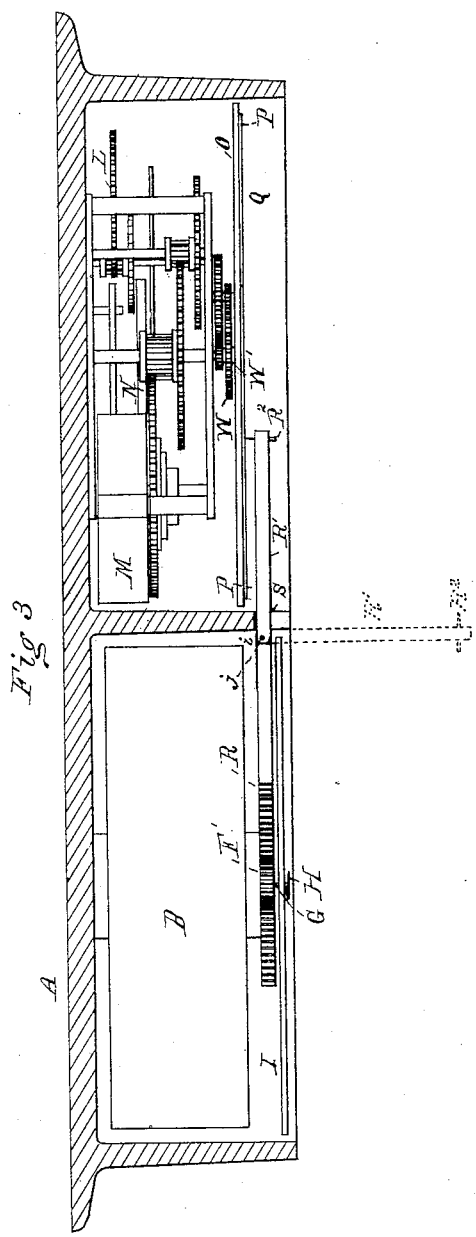

UNITED STATES PATENT OFFICE.

EARL AMRI THISSELL, OF LOWELL, MASSACHUSETTS.

RECORDING-GAGE.

SPECIFICATION forming part of Letters Patent No. 253,786, dated February 14, 1882.

Application filed November 21, 1881. (No model.)

*To all whom it may concern:*

Be it known that I, EARL AMRI THISSELL, of Lowell, in the county of Middlesex and Commonwealth of Massachusetts, have invented certain new and useful Improvements in Recording-Gages, of which the following is a specification.

My invention relates to improvements in the means of recording the pressures of steam or other fluids, as indicated by gages, in which a pointer or hand turns with a shaft caused to revolve by such pressure.

In the accompanying drawings, (on two sheets,) Figure 1 is a perspective view of a gage provided with my recording devices. Fig. 2 is a similar view, the hand and face of the gage being removed to show the mechanism which turns said hand. Fig. 3 is a longitudinal section of the same.

A is a metallic case of the form shown in Fig. 1, and having at one end the well-known mechanism of an ordinary steam-gage and at the other a paper dial rotated by clock-work. The gage consists of a flattened tube, B, bent, as shown in Fig. 2, into a horseshoe form, and having its open end B' secured within the case to a pipe, $B^3$, connecting with the boiler above the water-line of the same. The closed end $B^2$ of the tube B is connected by a link or connecting-rod, C, to a sector-shaped lever, D, at the lower end thereof, said lever D being pivoted at D' in the frame E, and being provided at its upper curved end with a rack, $D^2$, which takes into a pinion, F, on the shaft G. The shaft G turns in the frame E, and is provided with a pointer, H, at its front end, said front end projecting through a circular face, I, provided with a scale, K. The frame E is securely fastened to the back of the case A. The pressure of the steam within the tube B tends to straighten said tube, and thereby moves the shaft G around and causes the end of the pointer H to travel over the scale to a greater or less distance, depending on the amount of such pressure. The parts above described are in common use, except that the case is commonly circular. In the other end of the case A is a train of clock-work, L, caused by the coiled flat spring M to run for twenty-four hours, (or for a longer or shorter time, as may be thought desirable,) and provided with a balance-wheel, N, to regulate the motion of said clock-work. The clock is of the ordinary construction, except that the pinion, W, which ordinarily carries the hour-hand, has twice the number of teeth usually given to it, so that the hour-hand shaft W' revolves once in twenty-four hours instead of once in twelve hours. In place of the usual hour-hand there is a disk, O, preferably of metal, centrally attached to said hour-hand shaft and revolving with it. This disk O is provided with a number of pins, P, projecting from its face, the object of said pins being to hold a dial, Q, of paper on said disk. The paper dial is divided by lines into twenty-four equal sectors, Q', and into a number of concentric circles, $Q^2$, equal in number to the number of degrees marked on the scale K. The sectors Q' are numbered with the hours of the day and night, as shown in Figs. 1 and 2, and the circles $Q^2$ may also be numbered to correspond with the figures on the scale K indicating the number of pounds of pressure of the steam. The shaft G is provided with another pinion, F', and this pinion takes into a rack, R, on a bar, R', supported by and sliding on the frame E, between said pinion F' and a block, E', secured to said frame, said bar R' also sliding in a slot, S, cut in the top of the partition A', which divides the case A, as shown in Figs. 2 and 3.

It is evident that as the top of the pointer H in Fig. 1 turns to the left the bar R' will move to the right, and the parts are so proportioned that a pencil, $R^2$, inserted in the bar R' will always stand on the circle which bears the number indicated at that time by the pointer H on the scale K, so that an accurate record of the pressure at every hour of the day will be traced on the paper dial by the pencil or marker $R^2$.

A joint, *j*, in the marker-rod R' adapts the marker to be thrown outward, as shown in dotted lines in Fig. 3, and a blade-spring, *i*, Fig. 3, crossing this joint, tends to hold the marker in working position.

A metallic front plate or cap, T $T^2$, Fig. 1, is constructed in two parts, with a central vertical parting-line, at which the parts are united by hinges *h h*. The part T has a circular opening in front of the dial I, and may be made fast to the body A by screws. The part $T^2$ has a glazed circular opening in front of the rotary dial Q, is adapted to open on the hinges $h$, and may be locked in shut condition in customary manner. When said part $T^2$, which may be termed the "door," is opened, direct access is had to the marker $R^2$, and to the rotary dial Q behind the same, and with the aid of a notch or slot, $s$, cut in the parting edges of the respective parts of the front plate, $T\,T^2$, and into the stationary dial I a sufficient distance, the marker may be thrown forward, as aforesaid, although its joint $j$ may be behind said dial I, as shown in the drawings. This provides for readily renewing the paper dial Q, which must be done once in twenty-four hours. The used dial is withdrawn from the pins P and a fresh one applied in its place. The marker $R^2$ is then returned to its working position and the door $T^2$ is closed and secured in front thereof, as shown in Fig. 1, which prepares the apparatus for continued use. A suitable opening in the dial-carrier O affords access to the winding-shaft of the clock mechanism when said carrier O is exposed in renewing the dial Q.

Having thus described my said invention, I claim—

A recording-gage for showing side by side the momentary indications of pressure and a continuous record of the same on a pair of circular dials, comprising a paper dial removable from a rotary carrier for receiving the record of each day, a marker having a jointed rod connected with the shaft of the index-hand, a notched stationary dial in front of the marker-rod, behind said index-hand, and a hinged and slotted front plate, substantially as herein specified, for the purpose set forth.

EARL AMRI THISSELL.

Witnesses:
ALBERT M. MOORE,
WILLIAM L. DAVIS.